Figure 1:
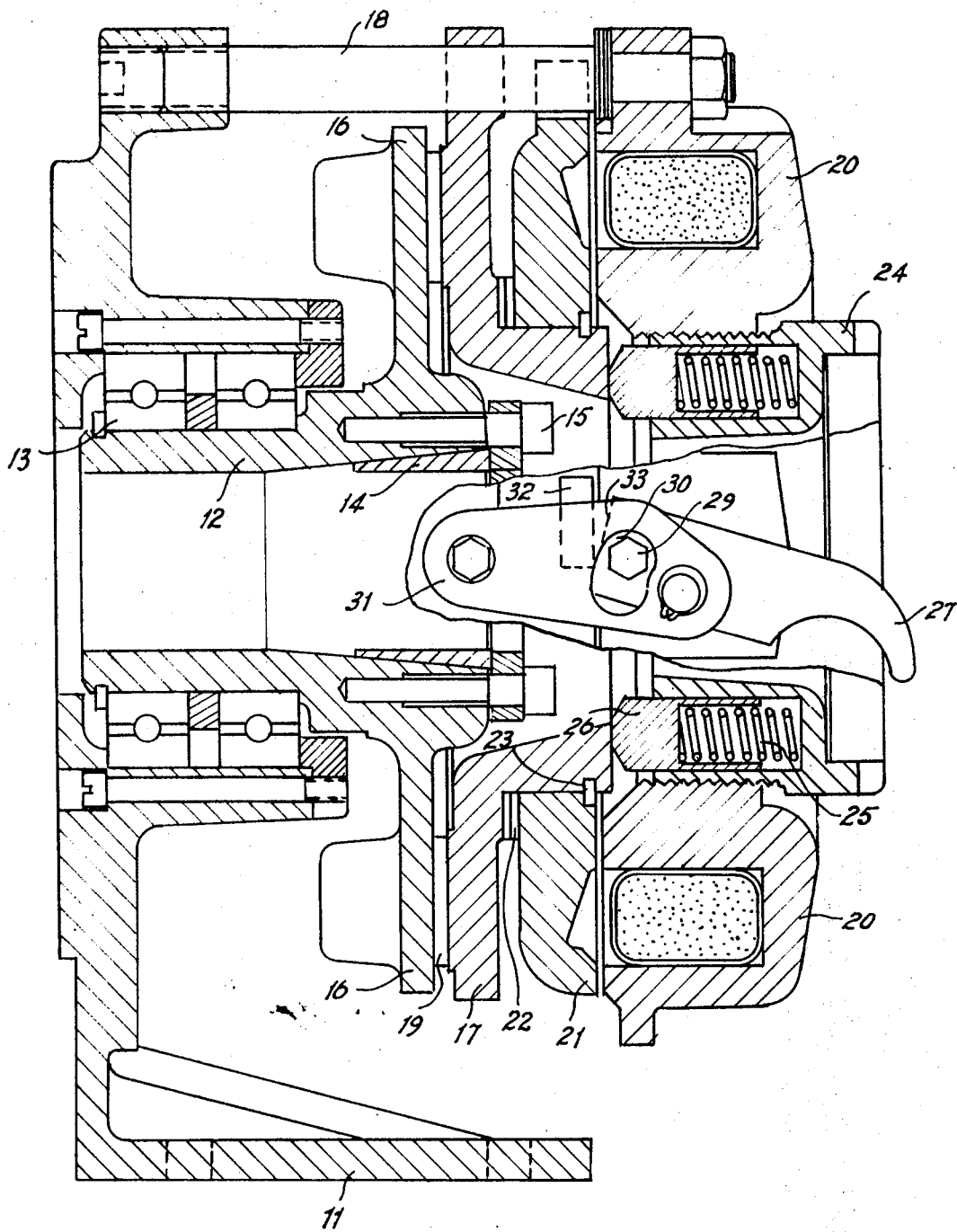

United States Patent

[11] 3,608,679

| [72] | Inventor | Stanley George Harrison<br>Leederville, Western Australia, Australia |
|---|---|---|
| [21] | Appl. No. | 839,255 |
| [22] | Filed | July 7, 1969 |
| [45] | Patented | Sept. 28, 1971 |
| [73] | Assignee | Westate Electrical Industries Limited<br>Leederville, Western Australia, Australia |
| [32] | Priority | Nov. 18, 1968 |
| [33] | | Australia |
| [31] | | 46397/68 |

[54] ELECTRICALLY OPERATED BRAKING DEVICE
7 Claims, 2 Drawing Figs.

[52] U.S. Cl. ................................................ 188/171,
    188/72.3
[51] Int. Cl. ....................................................F16d 65/24,
    F16d 55/22
[50] Field of Search........................................... 188/72.3,
    171, 170

[56] References Cited
UNITED STATES PATENTS

| 2,025,098 | 12/1935 | Dudick | 188/171 |
| 2,059,028 | 10/1936 | Price | 188/171 |
| 2,467,891 | 4/1949 | Hollander | 188/171 |
| 2,974,756 | 3/1961 | Roehm | 188/171 |
| 3,171,515 | 3/1965 | Wolfe | 188/171 |

*Primary Examiner*—Duane A. Reger
*Attorney*—Watson, Leavenworth & Kelton

ABSTRACT: A braking device for a machine having a rotating shaft wherein a brake disc is attached to the shaft for rotation therewith, the brake disc facing a brake plate which plate is held away from the brake disc by an electromagnet, manually operable locking means being provided to lock the brake plate in a released position when the electromagnet is deenergized, the locking means being automatically disengaged when the electromagnet is energized.

ELECTRICALLY OPERATED BRAKING DEVICE

This invention relates to a braking device for a machine having a rotating shaft, and in particular relates to a braking device for an electric motor.

With brake devices in use at the present time, it is not possible to rotate the shaft of the machine or motor when the machine or motor is not operating. It is necessary with such machines, in operations where work has to be set up prior to the operation of the machine, that the shaft should be able to be rotated manually.

It is therefore an object of the present invention to provide a braking device for the rotating shaft of a machine, which braking device is capable of being released when the machine is not operating.

Accordingly the present invention resides in a breaking device for attachment to a machine having a rotating shaft, said brake device comprising a brake disc adapted to be attached to said shaft for rotation therewith, a brake plate facing the brake disc and movable towards and away from the brake disc, and electromagnet located on the side of the brake plate remote from the brake disc such that energization of the electromagnet causes the brake plate to move away from the brake disc, the brake plate being spring-biased so as to engage said brake disc to retard or stop rotation of said shaft when said electromagnet is deenergized, and manually operable means for locking the brake plate in a released position when the electromagnet is deenergized, said means for locking being arranged so as to be automatically disengaged when the electromagnet is energized.

In a further form the invention resides in an electrically operated brake motor, comprising a motor shaft free to rotate with the rotor of the motor within the motor housing, a brake disc mounted adjacent one end of the motor shaft for rotation therewith, a brake plate facing the brake disc and movable towards and away from the brake disc, an electromagnet located on the side of the brake plate remote from the brake disc such that energization of the electromagnet causes the brake plate to move away from the brake disc, the brake plate being spring-biased so as to engage said brake disc to retard or stop rotation of said motor shaft when said electromagnet is deenergized, and manually operable means for locking the brake plate in a released position when the electromagnet is deenergized, said means for locking being arranged so as to be automatically disengaged when the electromagnet is energized.

In order, however that the invention may be more clearly understood it will now be described with reference to the accompanying drawings, but it will be appreciated that the invention is not limited to the embodiments shown therein.

Figure 2:
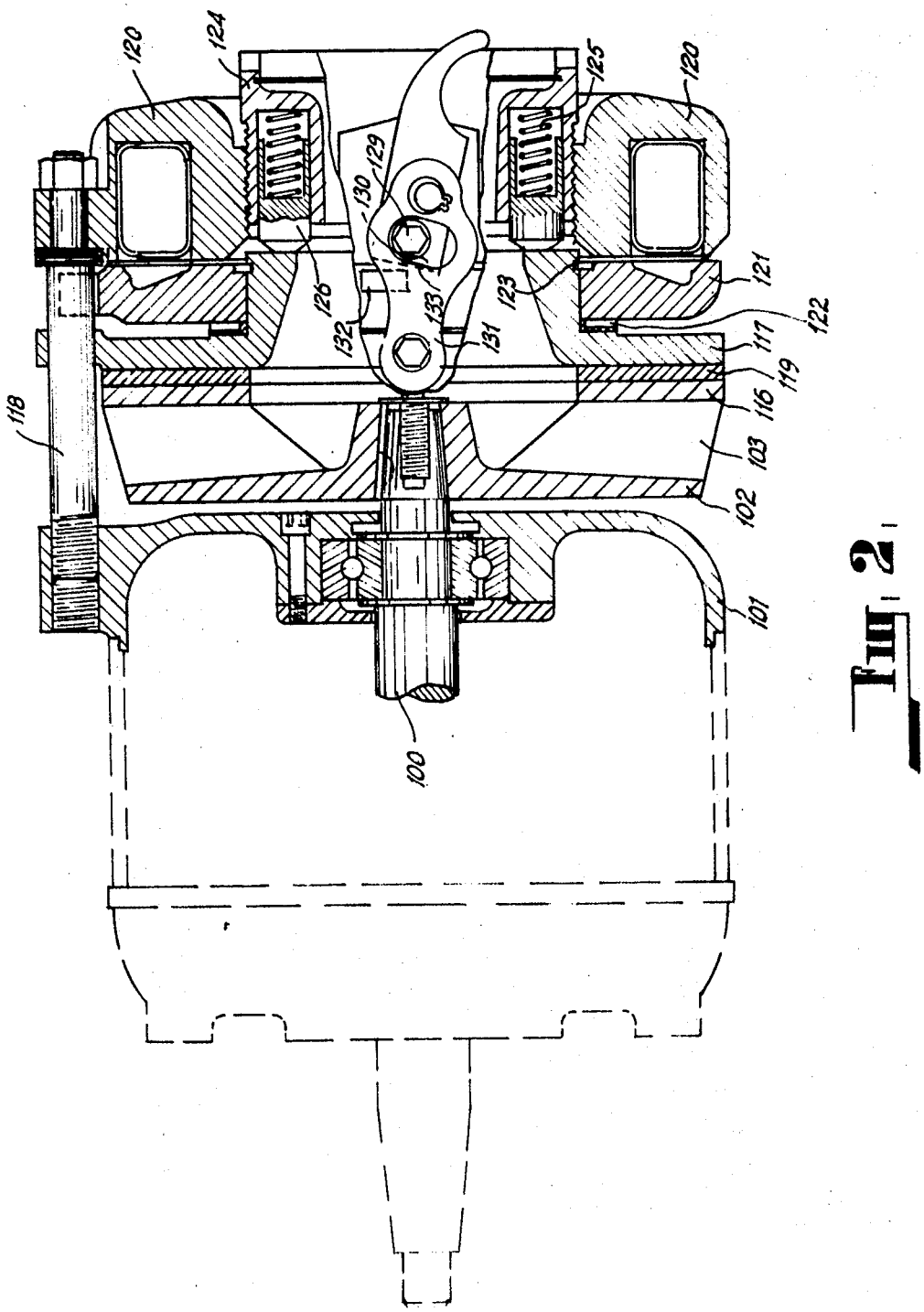

In the drawings;

FIG. 1 illustrates a section through the center of the braking device to be attached to a rotating shaft; and FIG. 2 illustrates a section on the centerline of an electric brake motor, the motor casing being shown in dotted outline with the motor details omitted.

In the embodiment shown in FIG. 1 of the drawings, the braking device is provided with a supporting frame 11 through which the rotating shaft (not shown) of the machine passes. A collar 12 which is adapted to surround the rotating shaft of the machine is mounted in a suitable bearing 13 the shaft being held in the collar 12 in this particular embodiment by a collet 14, the collet being arranged to grip the rotating shaft by adjustment of adjustment screws 15. The shaft may terminate at the collet 14 or alternatively may pass right through the braking device.

An annular brake disc 16 is attached to and surrounds the collar 12 and an annular brake plate 17 is mounted facing the brake disc 16 for movement towards and away from the disc 16, the brake plate 17 having a plurality of splines or guide pins 18 passing therethrough, the guide pins 18 being connected to the supporting frame 11 so that the brake plate 17 is capable of sliding movement on the guide pins 18 in a direction parallel to the longitudinal axis of the rotating shaft. The surface of the brake plate 17 adjacent the brake disc 16 is preferably provided with a brake lining 19.

Mounted immediately adjacent the brake plate 17 on the opposite side thereof to the brake disc 16 is substantially annular electromagnet 20, or alternatively a plurality of spaced electromagnets, the brake plate 17 preferably having an annular armature 21 mounted adjacent the electromagnet 20 such that energization of the electromagnet results in movement of the brake plate 17 away from the brake disc 16. The brake plate 17 and the armature 21 which are both free to move in a direction parallel to the longitudinal axis of the rotating shaft are separated preferably by a wave washer-type spring 22. The brake plate 17 and the armature 21 are however maintained to move as a single unit when the armature 21 is attracted to the electromagnet 20, by means of a circlip 23 mounted on a portion of the brake plate 17 which passes through the annular opening in the armature 21. This arrangement allows the brake plate 17 and the armature 21 to move towards each other whilst allowing them to move together in the same direction when the electromagnet 20 is energized.

An adjusting nut 24 is located within the opening of the annular electromagnet 20, the end surface of the nut 24 adjacent the brake plate 17 being provided with a plurality of recesses each of which is provided with a compression spring 25 which bears against a spring box 26. Each of the springs 25 act independently of each other, and when the electromagnet 20 is deenergized the springs 25 cause the spring boxes 26 to bear against the brake plate 17 to cause the brake plate to engage the brake disc 16 to retard and/or stop rotation of the shaft. The adjusting nut 24 is readily accessible as can be seen in the drawing and consequently the braking tension or force can be varied by tightening or loosening the adjusting nut 24 at any time when the shaft is rotating.

To enable the brake plate 17 to be locked in a released position when the motor is not operating, manually operable means are provided which will be automatically disengaged when the electromagnet 20 is energized. In the embodiment shown in FIG. 1, the manually operable means comprises one or more lever pivot arms 17 pivotally mounted at a point intermediate it or their ends on the periphery of the electromagnet 20, one end of the lever arm or arms 27 being arranged so as to pass through an opening in the casing (not shown) of the braking device. The setscrews 29 at the other end of the lever arm or arms 27 act as a stop passing through an opening 30 in a link member 31. The link member 31 has one end thereof pivotally connected to the periphery of the brake plate 17 the other end thereof being pivotally connected to the lever arm or arms 27 at the pivotal connection to the electromagnet 20.

The brake plate 17 may be locked in a released position when the setscrew 29 passes beyond the line connecting the centers of the pivot points of the link member 31 due to its movement. The brake plate 17 is released when the armature 21 is attracted to the electromagnet 20 since the resulting movement causes a lug 32 projecting outwardly from the periphery of the armature 21 to move over a cam face 33 on the end of the lever arm 27, until it passes the line joining the pivot points in a direction opposite to that for locking.

When the lever arm is operated to lock the brake plate in its released position it exerts forces in tow directions namely a. by causing the cam surface to engage the lug on the armature to force the armature away from the electromagnet and b. by applying a force to the link to cause the brake plate to be withdrawn from the brake disc.

The brake plate is locked in this released position when the pin connecting the link member to the lever arm passes beyond the centerline of the setscrew connecting the lever arm to the armature. The brake plate is released when the armature is attracted to the magnet and the lug strikes the cam surface of the lever arm thus pushing the pins past the centerline in a direction opposite to that for locking.

If desired, the lever arm may be provided with an extension which extends inside the casing adjacent the brake disc, the brake disc being provided with a centrifugal trip which when the machine is energized strikes the extension of the lever arm to automatically disengage the cam surface from the lug to release the brake plate. The lever arm may be provided with an overcenter return spring one end of which is attached to the casing the other end of which is attached to the lever arm so that release of the brake plate is ensured when the centrifugal trip strikes the lever arm.

If desired the collar 12 may be part of the hub of a centrifugal flow fan, and in this instance, the surface of the hub and the tips of the blades of the fan adjacent the brake plate 17 form the brake disc 16. The provision of the fan causes air to be induced to flow through the center of the annular electromagnet 20 and its associated armature 21, the air being directed onto the brake disc 16. Hence the brake disc is the most intensely cooled part of the whole braking device.

The braking device preferably incorporates means for presetting or reproducing a predetermined torque. In the present embodiment said means comprise a plurality of figures or other indicia cast on the end face of the electromagnet 20. The height of the indicia above the end face of the electromagnet 20 is set by the pitch of the thread of the adjusting nut 24, the nut having a suitable indicator line machined around its periphery, thus each turn of the nut 20 is clearly indicated by the indicia which coincides with the indicator line. Preferably the adjusting nut 24 is further provided with a pointer affixed thereto, the pointer being designed to indicate the portion or part of a turn through which the nut has been rotated. Hence using the indicia and the pointer it is possible to set the adjusting nut in any desired setting thus allowing the desired torque to be accurately set.

In the embodiment shown in FIG. 2 the braking device has been incorporated as portion of an electric brake motor. The electric motor shown in dotted outline, is of conventional construction and generally comprises a rotor on the motor shaft 100, the rotor together with the shaft being capable of rotation within the stator windings, the stator windings being closed in a motor casing 101.

Mounted adjacent one end of the motor shaft 100 is the hub 102 of a centrifugal flow fan or impeller, and an annular brake plate 117 is mounted facing the hub 102 for movement towards and away from the fan, the brake plate 117 having a plurality of splines or guide pins 118 passing therethrough, the guide pins being connected to the motor casing 101 so that the brake plate 117 is capable of sliding movement on the guide pins in a direction parallel to the longitudinal axis of the shaft 100. An annular brake disc 116 may be mounted between the hub 102 and the brake plate 117, the brake disc 116 thus being mounted on the end of the shaft 100. Preferably the surface of the hub 102 and/or the tips of the blades 103 of the fan adjacent the brake plate 117 form the brake disc 116. The surface of the brake plate 117 adjacent the brake disc 116 is preferably provided with a brake lining 119.

Mounted immediately adjacent the brake plate 117 on the opposite side thereof to the brake disc 116 is a substantially annular electromagnet 120 or alternatively a plurality of spaced electromagnets, the brake plate 117 preferably having an annular armature 121 mounted adjacent the electromagnet 120 such that energization of the electromagnet 120 results in movement of the brake plate 117 away from the brake disc 116. The brake plate 117 and the armature 121 which are both free to move in a direction parallel to the longitudinal axis of the motor shaft 100 are separated preferably by a wave washer-type spring 122. The brake plate 117 and the armature 121 are however maintained to move as a single unit when the armature 121 is attracted to the electromagnet 120 by means of a circlip 123 mounted on portion of the brake plate 117 which passes through the annular opening in the armature 121. This arrangement allows the brake plate 117 and the armature 121 to move towards each other whilst allowing them to move together in the same direction when the electromagnet 120 is energized.

An adjusting nut 124 is located within the opening of the annular electromagnet 120 the end surface of the nut adjacent the brake plate 117 being provided with a plurality of recesses each of which is provided with a compression spring 125 which bears against a spring box 126. Each of the springs 125 acts independently of each other, and when the electromagnet 120 is deenergized the springs 125 cause the spring boxes 126 to bear against the brake plate 117 to cause the brake plate to engage the brake disc 116 to retard and/or stop rotation of the motor shaft 100. The braking tension or force can therefore be varied by tightening or loosening the adjusting nut 124 at any time even when the motor is operating.

To enable the brake plate 117 to be locked in a released position when the motor is not operating, manually operable means are provided which will be automatically disengaged when the electromagnet 120 is energized. The manually operable means comprises one or more lever pivot arms 127 being arranged so as to pass through an opening in the motor casing, the other end of each of the lever arms 127 being provided with a cam face 133. The setscrews 129 securing lever arms 127 to electromagnet 120 act as a stop passing through an opening 130 in a link member 131. The link member 131 has one end thereof pivotally connected to the periphery of the brake plate 117, the other end thereof being pivotally connected to the lever arm 127 at its pivotal connection to the electromagnet 120.

The brake plate 117 may be locked in a released position when the setscrew 129 passes beyond the line connecting the centers of the pivot points of the link member 131 due to its movement. The brake plate 117 is released when the armature 121 is attracted to the electromagnet 120 since the resulting movement causes the lug 132 to move over the cam surface 133 until it passes the line joining the pivot points in a direction opposite to that for locking.

The brake of the brake motor operates in an identical manner to the braking device described in the previous embodiment.

The above described brake motor has a number of features and advantages which may be stated as follows:
1. Brake fails safe in the event of the cessation of electrical supply.
2. The brake is actuated by multiple balanced springs in such a way that the failure of any one spring would not materially reduce the efficiency of the brake.
3. The machine may be preset to any desired torque within the capacity of the machine by adjustment of the adjusting nut. As a result the precise rate of retardation or stopping may be attained so that the exact purpose for which the motor is installed may be achieved.
4. The whole system is air-cooled thereby preventing heating.
5. Wear rates are low resulting in preset torque remaining constant indefinitely. The low rate of wear is due to the lining being subjected to extremely low pressure and a constant high rate of cooling.
6. Any dust resulting from lining wear is immediately blown out of the machine thus preventing dangerous buildup.

In order that both the braking device and the brake motor may be made flameproof when used in hazardous locations such as where inflammable gases or liquids are present, the opening adjacent the armature, of the annular space into which the coil of the electromagnet is fitted is provided with a nonmagnetic ring (not shown) which is preferably a press fit therein, and which serves to isolate the coil of the electromagnet from the atmosphere surrounding the magnet. The nonmagnetic ring is usually formed of a suitable metal or metal alloy, but may if desired be formed of a suitable synthetic material. By this means, if, for any reason, the coil should become overheated or burn out, the heat or any sparks generated cannot reach the potentially explosive atmosphere surrounding the magnet.

I claim:
1. A braking device for attachment to a machine having a rotating shaft, said device comprising a brake disc adapted to be attached to said shaft for rotation therewith, a brake plate facing the brake disc and movable towards and away from the brake disc, an electromagnet located on the side of the brake plate remote from the brake disc such that energization of the electromagnet causes the brake plate to move away from the brake disc, spring means biasing said brake plate so as to engage it with said brake disc to retard or stop rotation of said shaft when said electromagnet is deenergized, manually operable means for locking the brake plate in a released position when the electromagnet is deenergized, said means for locking being arranged so as to be automatically disengaged when the electromagnet is energized, said electromagnet being of annular form, and an adjusting nut located within the opening in the annular electromagnet, the end face of the nut adjacent the brake plate being provided with said spring means, said spring means comprising a plurality of compression springs located one to each of a similar plurality of recesses in said end face, said compression springs being each arranged to bear against a spring box such that when the electromagnet is deenergized the compression springs cause said spring boxes to bear against said brake plate to cause the brake plate to engage the brake disc to retard and/or stop rotation of the rotating shaft.

2. A braking device as claimed in claim 1 wherein the coil of the electromagnet is located in an annular groove opening into the face of the electromagnet facing the brake plate, said opening being closed by a nonmagnetic ring to provide a flameproof enclosure for the coil.

3. A braking device as claimed in claim 1 wherein said manually operable means comprises a lever arm pivotally mounted on the periphery of the electromagnet, said lever arm being provided with a cam surface which is adapted to engage an outwardly projecting lug on the periphery of said armature, a link pivotally connected at one end to the periphery of the brake plate, the other end of said link being pivotally connected to the lever arm adjacent the pivotal connection to the armature such that when the armature is attracted towards the electromagnet, the lug moves over the cam surface to automatically disengage said means for locking.

4. A braking device as claimed in claim 1 wherein means are provided for presetting or reproducing a predetermined torque, said means comprising a plurality of indicia spaced on the end face of said adjusting nut, the height of the indicia above the end face being determined by the pitch of the thread of the adjusting nut, the electromagnet having a suitable indicator line machined thereon around the periphery of the nut such that each turn of the nut is clearly indicated by one of the indicia coinciding with the indicator line.

5. An electrically operated brake motor comprising a motor shaft free to rotate with the rotor of the motor within the motor housing, a brake disc mounted adjacent one end of the motor shaft for rotation therewith, a brake plate facing the brake disc and movable towards and away from the brake disc, an electromagnet located on the side of the brake plate remote from the brake disc such that energization of the electromagnet causes the brake plate to move away from the brake disc, an annular armature located between the electromagnet and said brake plate, the brake plate and the armature being separated by a wave washer-type spring but maintained to move as a single unit when the armature is attracted by the electromagnet by means of a circlip mounted on a portion of said brake plate which passes through the opening in the annular armature, spring means biasing said brake plate so as to engage it with said brake disc to retard or stop rotation of said motor shaft when said electromagnet is deenergized, and manually operable means for locking the brake plate in a released position when the electromagnet is deenergized, said means for locking being arranged so as to be automatically disengaged when the electromagnet is energized, said electromagnet including a coil located in an annular groove opening into the face of the electromagnet facing the brake plate, said opening being closed by a nonmagnetic ring to provide a flameproof enclosure for the coil.

6. A brake motor as claimed in claim 5, there being an adjusting nut located within the opening in the annular electromagnet, the end face of the nut adjacent the brake plate being provided with said spring means, said spring means comprising a plurality of compression springs located one to each of a similar plurality of recesses in said end face, said compression springs each being arranged to bear against a spring box such that when the electromagnet is deenergized the compression springs cause said spring boxes to bear against said brake plate to cause the brake plate to engage the brake disc to retard and/or stop rotation of the motor shaft.

7. A brake motor as claimed in claim 5 wherein said manually operable means comprises a lever arm pivotally mounted on the periphery of the electromagnet said lever arm being provided with a cam surface which is adapted to engage an outwardly projecting lug on the periphery of said armature, a link pivotally connected at one end to the periphery of the brake plate, the other end being pivotally connected to the lever arm adjacent the pivotal connection to the armature such that when the armature is attracted towards the electromagnet, the lug moves over the cam surface to automatically disengage said means for locking.